Patented May 8, 1928.

1,668,660

UNITED STATES PATENT OFFICE.

SAICHI SHIMAMOTO, OF TOKYO, JAPAN.

METHOD OF TREATING PULVERIZED VEGETABLE FUELS.

No Drawing. Application filed November 1, 1926. Serial No. 145,707.

My invention relates to a method of treating sawdust, chips of wood, chaff and other pulverized vegetable fuels. The object of the invention is to obtain such pulverized vegetable fuels as burn easily and long, produce little smoke and possess great heating power.

Hitherto, wood pieces such as chips of wood and sawdust have been difficult to burn in a furnace of ordinary construction, and therefore a furnace of special construction has been used for them. Sawdust is sometimes pressed and solidified with pasty matter, but it is weak in heating power and does not burn long, being quite unfit as fuel for domestic and factory use. However, according to the present invention pulverized vegetable fuels are treated by a very simple process, and fuels which burn easily and long, produce little smoke and possess great heating power can be obtained. The essential feature of the invention consists in steeping powdered vegetable fuels like sawdust in lime water so as to make them soft and sticky and then drying the same.

In this invention water is added to quick lime to slake it, at the same time throwing pulverized vegetable fuels thereinto. Then, the milk of lime will act upon the tissue of the vegetables owing to its alkali nature and make them soft and sticky enough to facilitate the solidification of fuels. Moreover, the presence of the slaked lime enables the fuels to burn long.

The following is the manner of carrying this invention into practice:—

Throw 4 to 4.5 kilograms of quick lime into 18 to 27 litres of water to slake it, and steep 20 to 23 kilograms of sawdust or chips of wood or chaff and other pulverized vegetable fuels in it while it is still hot. Leave the same alone for several hours. On this occasion, temperature is sometimes raised by blowing steam thereinto. Then, the wooden part will become soft and sticky. Mix 10 to 14 kilograms of powdered coal with the above and press and solidify the mixture into the desired shape. Sometimes, little pieces of weeds or straw are mixed with the above sawdust and other pulverized vegetable fuels and steeped in lime water.

In the present invention the pulverized vegetable fuels made soft and sticky with milk of lime are sometimes solidified as they are in little lumps and, after dried, are used together with such fuels as coal, etc., by scattering them on the latter, or, after solidified into the desired shape, have heavy oil or other liquid fuel absorbed. The lime water used in this invention is sometimes mixed with starch paste or other pasty matter to help the solidification of the fuels.

Having now particularly described and ascertained the nature of my said invention and in what manner the same is to be performed, I declare that what I claim is:—

1. The process of converting pulverized wood materials into a fuel having easy burning, small smoke forming and large heat producing qualities which consists in subjecting sawdust to the action of a hot milk of lime solution to soften the sawdust so that it may be thereafter pressed into briquettes, mixing powdered coal therewith and then pressing and drying the resulting product.

2. The process of converting pulverized wood materials into a fuel having easy burning, small smoke forming and large heat producing qualities which consists in subjecting sawdust to the action of a hot milk of lime solution to soften the sawdust so that it may be thereafter pressed into briquettes, the amount of sawdust being about five times as great as the amount of lime, mixing powdered coal therewith and then pressing and drying the resulting product.

In testimony whereof I have affixed my signature.

SAICHI SHIMAMOTO.